April 15, 1969  R. J. WILCOX  3,438,111

METHOD OF MAKING A VEHICLE WHEEL RIM

Filed May 3, 1966  Sheet 1 of 2

INVENTOR.
RAYMOND J. WILCOX
BY
Barnes, Kisselle, Raisch & Choate
ATTORNEYS

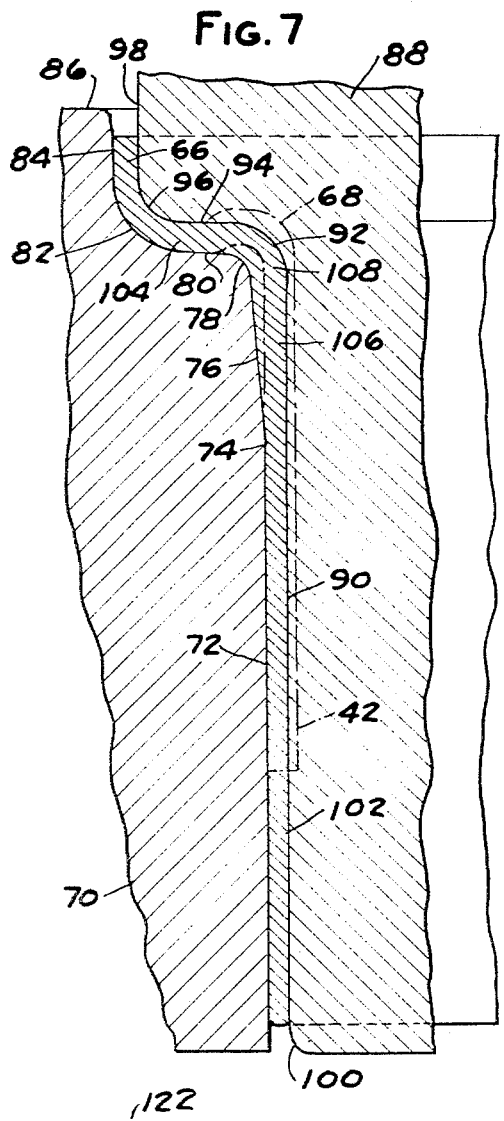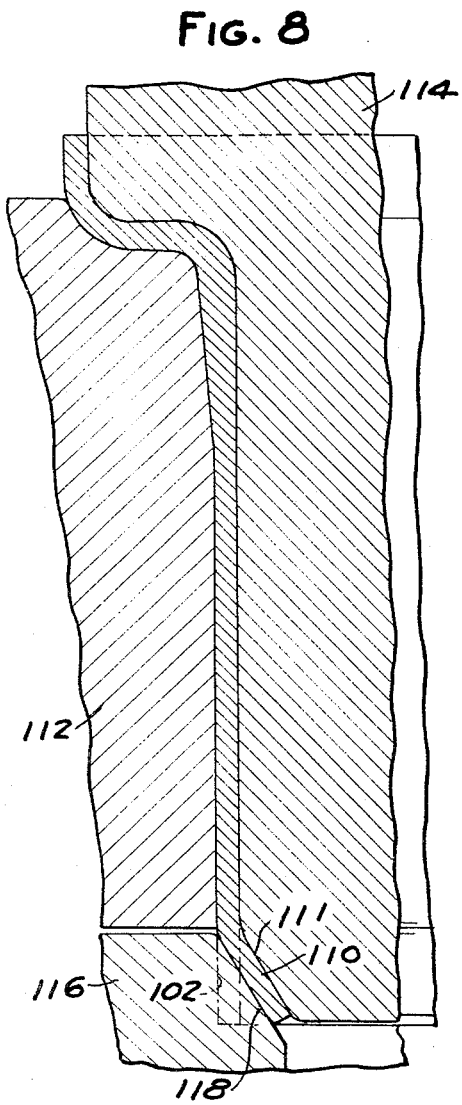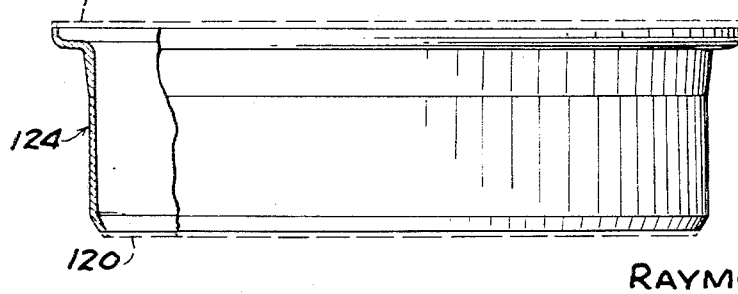

United States Patent Office 3,438,111
Patented Apr. 15, 1969

3,438,111
METHOD OF MAKING A VEHICLE WHEEL RIM
Raymond J. Wilcox, Bloomfield Hills, Mich., assignor to Motor Wheel Corporation, Lansing, Mich., a corporation of Ohio
Filed May 3, 1966, Ser. No. 547,270
Int. Cl. B21h 1/10; B21k 1/38
U.S. Cl. 29—159.1      3 Claims

ABSTRACT OF THE DISCLOSURE

A method of making a truck wheel rim in which a hoop-like blank of uniform thickness strip stock in expanded at one end to form a tire-retaining flange at one end of the rim. Then a reduced thickness bead-receiving portion of the rim is formed by ironing in a draw die set the portion of the blank between the flange and the opposite end of the rim.

---

This invention relates to the manufacture of vehicle wheels and more particularly to a method of making a rim for a heavy duty truck wheel.

Heavy duty truck rims must be, among other things, both strong and lightweight. These requirements have led to the present day design wherein the radial cross section of the rim varies in thickness from one axial end of the rim to the other. For example, as shown in United States Patent 2,363,182, Hunt et al., the finished rim is usually thickest at or adjacent the tire-retaining flange and then becomes progressively thinner from the bead seat-flange junction toward the inturned flange at the opposite end of the rim to thereby provide sufficient strength where needed without excess weight elsewhere.

Hitherto, the aforementioned type of tapered truck rims have been fabricated commercially from special stock purchased from the steel mill in which the variations in cross-sectional thickness where rolled into the steel at the mill, the thicker portions being located at those points which are subjected to a bending or forming action during the beading or flanging operations. This mill section was then cut to length, coiled, welded, trimmed and final formed. One example of this prior commercial method is shown in the United States Patent 1,587,020, Michelin.

An object of the present invention is to provide an improved method of making a tapered truck rim of the above character from a starting blank of uniform thickness, thereby effecting a considerable cost saving by obviating the need for purchasing special mill section strips as the starting material for fabrication of truck rims.

Other objects, features and advantages of the present invention will become apparent from the following detailed description taken in conjunction with the accompanying drawings wherein:

FIGS. 5, 6, 7 and 8 are enlarged fragmentary axial center sections illustrating in sequence the method of die forming the blank of FIG. 2 into a tapered truck rim in accordance with the present invention.

FIG. 9 is a side elevational view of the truck rim produced in accordance with the method of the invention, a portion being broken away to illustrate the finished cross-sectional contour of the rim.

Figure 1:
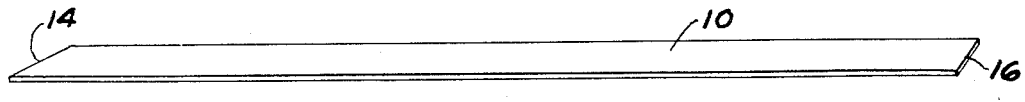
FIG. 1 is a perspective view of a starting blank from which a truck rim is fabricated in accordance with the method of the present invention.

Referring in more detail to the drawings, FIG. 1 shows a starting blank 10 adapted for processing in accordance with the method of the present invention and comprising a flat rectangular strip of material such as steel or any other metal or alloy suitable for forming truck wheel rims of the aforementioned type. Strip 10 is of substantially uniform thickness throughout its entire area and has a predetermined length, width and thickness for development into the finished rim of FIG. 9, taking into account the various dimensional changes incurred in forming of the strip by the method of the invention described hereinafter.

Figure 2:
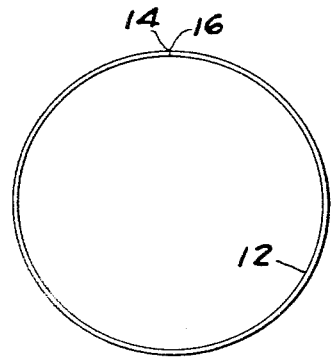
FIG. 2 is a side elevational view of the blank after the same has been coiled into a hoop.
Figure 3:
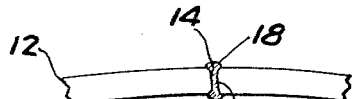
FIG. 3 is a fragmentary enlarged side elevational view of the abutting ends of the blank of FIG. 2 after the same have been flash butt welded together.
Figure 4:
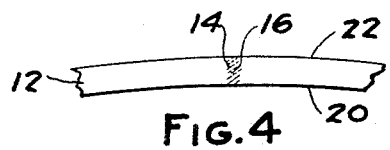
FIG. 4 is a view similar to FIG. 3 after the weld has been trimmed.

Pursuant to the method of the invention, strip 10 is first coiled into a hoop 12 to bring its opposite ends 14 and 16 into abutment (FIG. 2). Ends 14 and 16 are then flash butt welded to join the same at the weld 18 (FIG. 3). The weld is then trimmed so that the inner and outer surfaces 20 and 22 of the hoop are smooth across the welded joint (FIG. 4). Hoop 12 as thus prepared is then subjected to a series of die forming or stamping operations, as illustrated in sequence in FIGS. 5–8 inclusive.

Figures 5, 6:
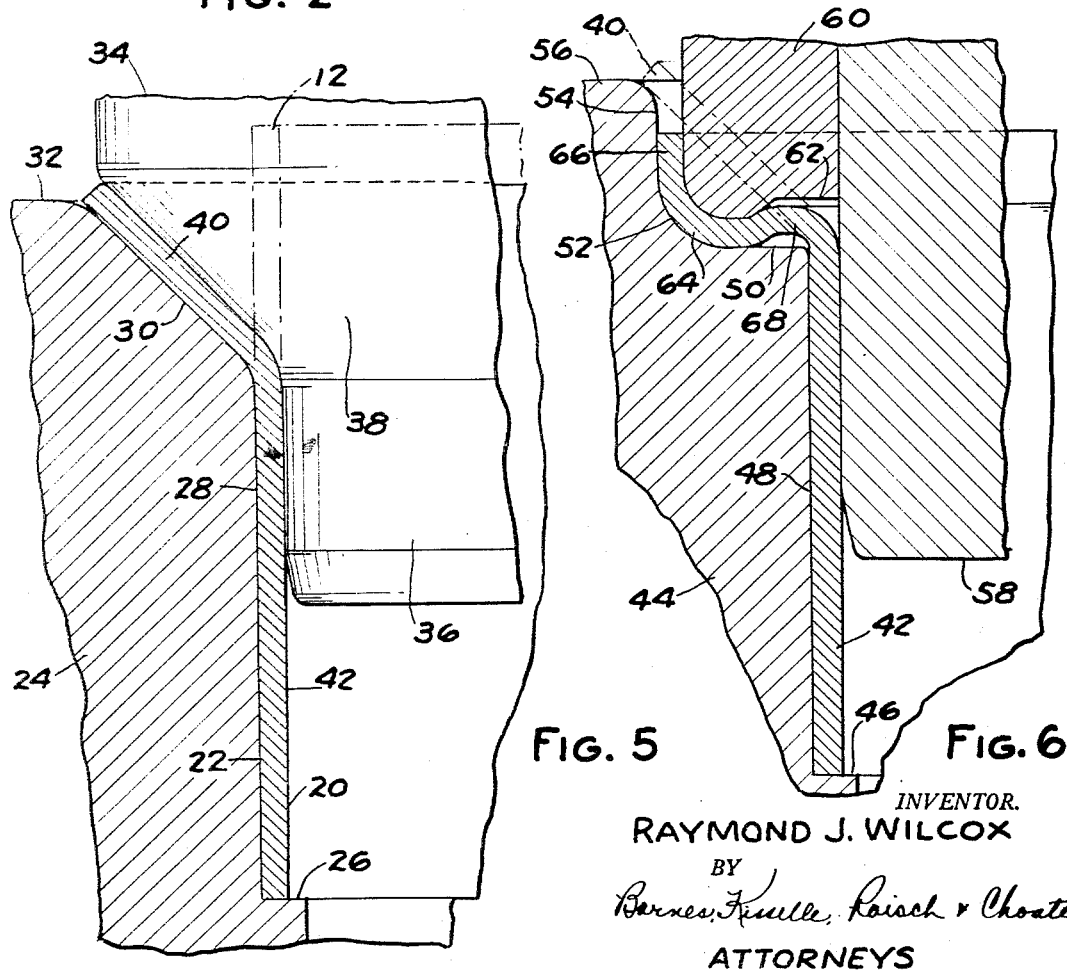

Referring to FIG. 5, a female die 24 is provided into which hoop 12 is inserted endwise or axially until the inner end edge of the blank abuts a radial shoulder 26 at the lower end of a cylindrical portion 28 of the die cavity. Wall 28 extends for about two thirds of the axial dimension of the blank and terminates at an outwardly flaring conical surface 30 of die 24 which in turn extends to the top surface 32 of the die. A male flaring die 34 is also provided which has a cylindrical pilot 36 adapted for insertion into the upper end of blank 12, followed by a flaring section 38 of conical contour complemental to surface 30 of the female die and dapted to flare the upper end of blank 12 outwardly into a conical end section 40 to facilitate subsequent working of the same into the tire-retaining flange of the rim, the remaining cylindrical portion 42 of the blank being unaltered in this step. The expansion of the upper end of the blank 12 in the flaring step produces a slight decreasing taper from the junction of portions 42 and 40 to the upper end of the flare 40. The die set is then opened and blank 40–42 stripped therefrom.

Referring to FIG. 6, the flared blank 40-42 is next transferred to another die set comprising a female die 44, the cylindrical portion 42 of the blank being inserted axially into the die until its lower end abuts a radial shoulder 46 at the lower end of the cylindrical wall 48 of the die cavity. Wall 48 terminates at its upper end at a shoulder 50 which extends radially outwardly flush with the inner end of flare 40 to a radius 52 which in turn merges into a short cylindrical wall 54 extending upwardly to the top surface 56 of die 44. These surfaces 56 and 54 are rounded at their junction to receive the upper end of flare 40 thereagainst in the fully inserted position of blank 40–42 (FIG. 6).

The die set of FIG. 6 also includes a two part male die comprising a pilot 58 and an annular forming die 60 encircling die 58 and contoured to work flare 40 to the preliminary flange cross section shown in FIG. 6. Die 60 has a reentrant end face 62 adapted to provide a clearance space between shoulder 50 and die 60 at the junction of flare 40 and cylindrical portion 42. This clearance accommodates upset flow of the metal and permits pure bending action in the portion of the rim disposed in this space when die 60 is lowered into forming relation against flare 40 to form a flange having the radius portion 64 and axial lip 66. Since lip 66 is unrestrained, it tends to slide down wall 54 with the descent of punch 60, thereby tending to maintain the cross-sectional thickness of flare 40 in lip 66 and radius 64 while slightly thickening the blank in the return bend portion 68 disposed between die surfaces 50 and 62.

After the rim blank has been formed to the contour of portions 42, 68, 64 and 66 shown in FIG. 6, dies 44 and 58–60 are opened and the blank transferred to the next stage of die forming shown in FIG. 7. In this step a female die 70 is provided having an annular die cavity defined by a substantially cylindrical wall 72 (having a small draft angle and hence being slightly larger in diameter at its upper end) which meets at 74 an outwardly inclined conical wall 76. Wall 76 terminates at an outside radius 78 which leads into a radially outwardly extending surface 80 and which in turn merges with an inside radius 82 leading into the short cylindrical surface 84 running to the top surface 86 of die 70. The contour defined by the female die surfaces 72, 76, 78, 80, 82 and 84 is that of the finished contour of the outer surface 22 of the rim, except for the extreme lower end of the rim blank.

The male die 88 of the die set of FIG. 7 has a relatively long nose with a substantially cylindrical circumferential surface 90 which substantially parallels surface 72 of die 70, and which has a diameter greater than the inside diameter of the cylindrical portion 42 of the blank. Surface 90 is axially coextensive with surface 72 plus surface 76 of die 70 and terminates at its upper end at an inside radius 92 which in turn merges into a radial surface 94, surface 94 in turn terminating at an outside radius 96 which leads into the cylindrical surface 98 at the upper end of die 88. The contour of die 88 defined by surfaces 90, 92, 94, 96 and 98 is complemental to the contour of the inner surface of the finished rim, except for the lower end of the rim.

The blank 42–68–64–66 produced in the operation shown in FIG. 6 is inserted endwise into the open die 70 to the position shown in broken lines in FIG. 7 wherein the partially formed flange and lip portions 64 and 66 rest against the surfaces 82 and 84 of die 70, and portion 42 is seated against the adjacent portion of surface 72. Male die 88 is then lowered into engagement with the blank, the rounded corner 100 at the leading end of the nose of die 88 first striking the return bend portion 68 of the blank and expanding this portion radially outwardly toward surface 78 of die 70. As the nose of die 88 moves downwardly along the inner surface of portion 42 of the blank, it expands the bead seat portion 106 of the blank toward surface 76 and into a firm contact therewith. When the radius 100 of die 88 reaches approximately the junction 74 of surfaces 76 and 72, an ironing action begins due to the spacing between surface 90 and surface 72 being less than the thickness of portion 42 of the blank. Thus as die 88 moves further into the blank, it squeezes the blank metal between die surfaces 72 and 90 and produces an axial flow of the metal of blank portion 42 so that the same is elongated axially of the rim and simultaneously reduced in radial thickness to produce the axially elongated portion 102. By the time die 88 reaches the position shown in FIG. 7, die surfaces 92, 94 and 96 have engaged the flange and bead seat areas of the rim blank and have imparted the final contour thereto.

By way of example, a truck rim blank after forming by the steps shown in FIGS. 1–7 may have a final thickness in lip 66 of .282" near its outer edge increasing to .302" at its junction with flange portion 104. The flange portion 104 has a greater thickness, for example, .308", while the junction 108 of flange 104 and bead seat portion 106 has the thickest cross-sectional dimension, which may for example be .335". The rim portion 102 may have a substantially uniform thickness but with a slight taper imparted by a draft angle provided between dies 70 and 88 so that portion 102 may have a thickness of .195" near its lower end (as viewed in FIG. 7) gradually increasing over an axial distance of about 5" to a thickness of .201" at 74. Bead seat portion 106 has an axial dimension of about 1¾" and will have a tapering cross section of increasing thickness from portion 102 to the corner 108, increasing from .201" to .350". The foregoing dimensions are intended to be exemplary only to indicate the extent of the variation in cross-sectional thickness from one axial end of the rim to the other obtainable from the sequence of die forming operations shown in FIGS. 5, 6 and 7.

The last die forming step is shown in FIG. 8 wherein the rim formed in FIG. 7 is re-struck at the end opposite the bead seat to form an inwardly inclined conical flare portion 110. This is accomplished by providing a female die 112 having the same contour as die 70 but axially foreshortened at the lower end of the die so that portion 102 of the rim projects therebeyond, as indicated by the broken line showing thereof in FIG. 8. A male die 114 is also provided having the contour of die 88 at surfaces 98, 96, 94, 92 and 90, but with its leading end being tapered inwardly to provide a conical nose 114 having a contour complemental to the final desired contour of inner surface of flare portion 110. A restriking die 116 is also provided, which is a female die having an outwardly tapering conical surface 118 at its upper end adapted to engage and flare inwardly the projecting lower end of the portion 102 of the rim upon upward movement of die 116 to the position shown in FIG. 8. In this step, the blank as formed in FIG. 7 is first inserted into the cavity of die 112 with dies 114 and 116 retracted therefrom, then die 114 is lowered into the position shown in FIG. 8 so that it and die 112 serve as a clamp for holding the rim in place for flaring by die 116. The die parts are then separated and the rim removed, the resulting product of the steps shown in FIGS. 1–8 including both the broken and solid line portions shown in FIG. 9.

The final operation consists of a conventional trimming step wherein the end edge portions 120 and 122 (FIG. 9) of the finished rim 124 are removed by machining to eliminate any burrs and to bring the rim to its final axial dimension.

From the foregoing description, it will now be apparent that the method of the invention provides an economical die forming process for producing from inexpensive constant thickness mill stock heavy duty truck rims having a tapering thickness cross section with an optimum contour to provide the desired strength to weight ratio, the rim material being thickest at the points of maximum stress. In addition, the manner in which the metal of the rim is worked into the bead seat corner 108 tends to reduce work hardening in this critical area, while the ironing action produced in the step of FIG. 7 produces good metal flow, work hardening and a very smooth finish and contour in the axial portions 102 and 106 of the rim which provides a high strength rim and facilitates mounting of a tire on the rim and removal therefrom.

I claim:

1. A method of making a wheel rim comprising the steps of providing a strip of sheet stock of substantially uniform thickness, coiling said strip into a hoop of substantially uniform diameter with the ends thereof in abutment, welding said ends to secure the same together, flaring one end of said hoop outwardly to impart an expanded conical shape to said one end, stamping the flared portion of the hoop between a pair of axially opposed dies adapted to impart a radial flange and axial lip contour to the flared portion of said one end of said hoop, and ironing the bead-receiving portion of the rim disposed axially between the flange and the opposite end of the rim between generally complemental male and female draw dies having a contour adapted upon axial insertion of the male die into the bead-receiving portion to axially displace the bead-receiving portion of the rim and simultaneously reduce its radial thickness in response to axial movement of the male die within the blank while the blank is held fixed at the flanged end by said surrounding female die.

2. The method set forth in claim 1 including the further step of subsequently forming the end of the rim opposite the bead seat end into an inward conical flare shape by re-striking said end between outer and inner complemental forming dies.

3. A method of making a wheel rim having a tire-retaining flange at one end and a tapering thickness bead-receiving portion extending axially from said flange approximately to the opposite end of the rim comprising the steps of providing a hoop-shaped blank having a substantially uniform thickness radially thereof and a uniform outside diameter throughout its axial dimension substantially equal to the final outside diameter of the bead-receiving portion recited hereinafter, forming the tire-retaining flange at said one end of the blank, placing said blank in a die cavity adapted to receive the blank axially endwise therein, and then inserting a nose of a draw die axially into said one end of the blank, said nose being dimensioned relative to the die cavity to extend axially from said flange approximately to said opposite end of said rim and to impart an ironing action to said bead-receiving portion of the rim, and moving said nose axially relative to said blank until fully inserted in said blank such that said nose engages approximately all of said bead-receiving portion to thereby axially elongate and thin said bead-receiving portion as the male die is moved axially into the blank.

References Cited
UNITED STATES PATENTS

| | | | |
|---|---|---|---|
| 1,092,477 | 4/1914 | Einfeldt | 29—159.1 |
| 2,268,838 | 1/1942 | Lyon | 29—159.1 |
| 2,944,502 | 7/1960 | Lemmerz | 72—354 |
| 3,258,833 | 7/1966 | Schuttler | 29—159.1 |

THOMAS H. EAGER, Primary Examiner.

U.S. Cl. X.R.

72—347, 354